United States Patent [19]

Foster

[11] Patent Number: 4,475,707
[45] Date of Patent: Oct. 9, 1984

[54] SEAT SUSPENSION SYSTEM
[75] Inventor: Daniel S. Foster, Davenport, Iowa
[73] Assignee: Knoedler Manufacturers, Inc., Streator, Ill.
[21] Appl. No.: 263,602
[22] Filed: May 14, 1981
[51] Int. Cl.³ ............................................. F16M 13/00
[52] U.S. Cl. ....................................... 248/636; 248/430
[58] Field of Search ................ 248/424, 429, 430, 636

[56] References Cited

U.S. PATENT DOCUMENTS

| | | | |
|---|---|---|---|
| 2,986,199 | 5/1961 | Ferreira | 248/429 X |
| 3,100,617 | 8/1963 | Radke et al. | 248/430 |
| 3,190,592 | 6/1965 | Grizzle | 248/429 |
| 3,258,241 | 6/1966 | Oswald | 248/430 |
| 4,228,984 | 10/1980 | Thompson et al. | 248/636 |

FOREIGN PATENT DOCUMENTS

| | | | |
|---|---|---|---|
| 10387 | 4/1980 | European Pat. Off. | 248/430 |
| 465360 | 5/1937 | United Kingdom | 248/429 |
| 2041745 | 9/1980 | United Kingdom | 248/430 |

Primary Examiner—William H. Schultz
Attorney, Agent, or Firm—Robert E. Browne; Ralph R. Rath

[57] ABSTRACT

A seat suspension system includes a seat frame movably supported on a base in a fore and aft direction by guide rollers supported on the base and received into rails on the seat frame. A seat attenuating device supported on seat frame includes a rod rotatably supported on spaced brackets and having a lug extending rotatably therefrom between the supports with first and second coil springs telescoped over the rod and located between the lug and the respective supports. An accumulator is connected at one end to a rod and at the opposite end to one of the brackets, while a plate is supported on the base and has notches for receiving at least a portion of the lug to define a plurality of adjusted positions for the seat frame on the base. A lock-out member cooperates with the lug on the rod and is supported on the seat frame to fix the seat frame with respect to the base when desired.

5 Claims, 6 Drawing Figures

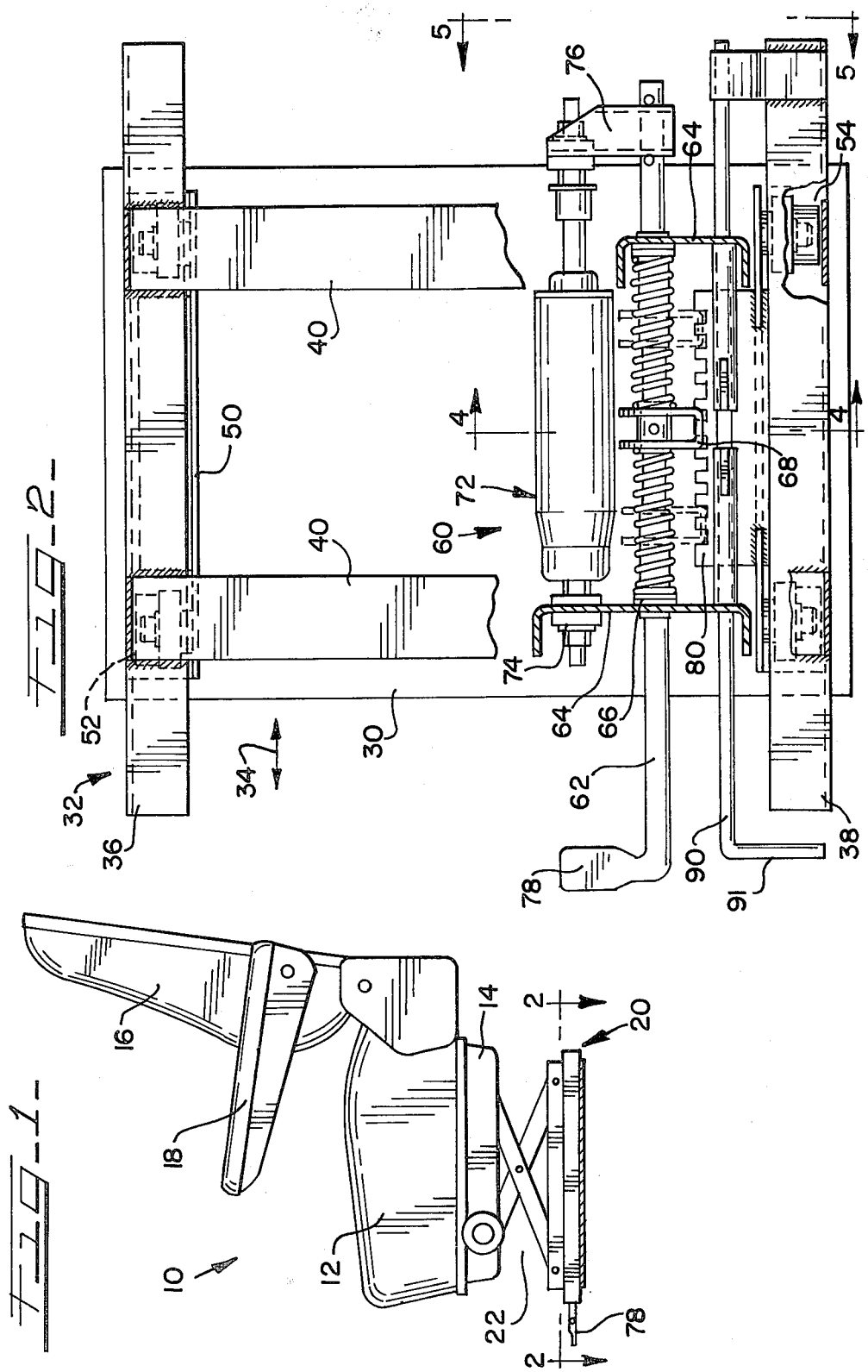

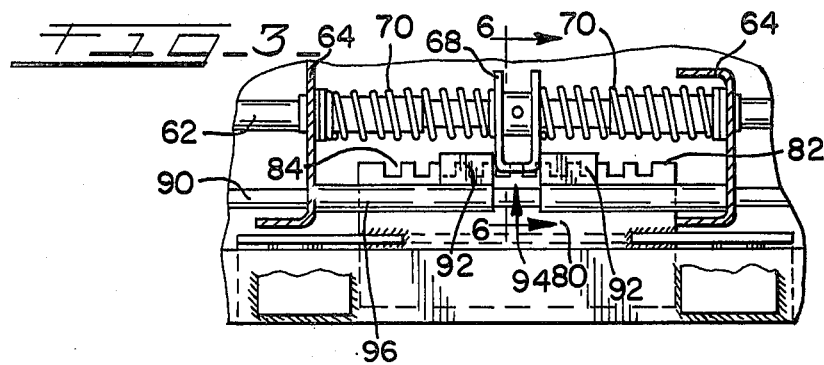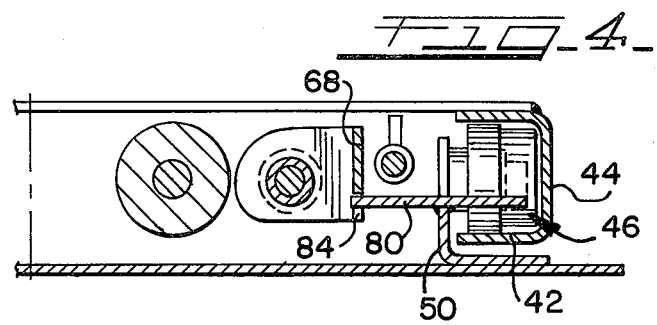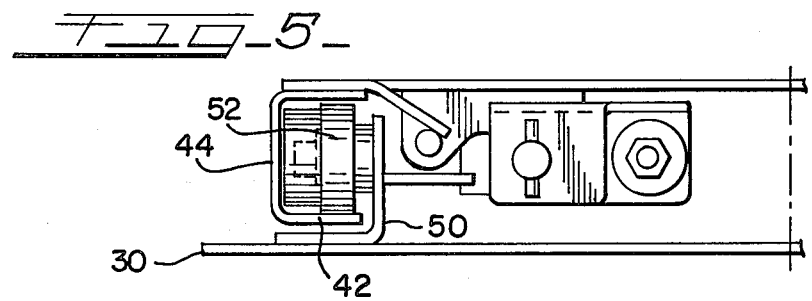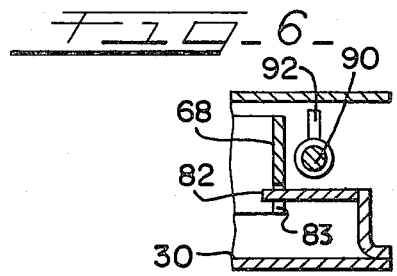

SEAT SUSPENSION SYSTEM

DESCRIPTION

1. Technical Field

This invention relates generally to seat suspension systems for vehicles and, more particularly, to a shock absorbing horizontal seat suspension for off-road vehicles.

2. Background Prior Art

Significant attention has been directed towards suspension systems for off-road vehicles, such as tractors and other agricultural equipment. Seat suspension systems are rather elaborate in construction and have capabilities of various adjustments to enhance rider comfort. Many commercially-available seats and suspension systems now incorporate attenuating mechanisms for absorbing vertical vibration forces, as well as horizontal vibration forces or shocks that are routinely encountered during the use of the vehicle. Most of these seats also incorporate lock-out devices to deactivate either or both mechanisms.

One type of horizontal seat suspension system that has been proposed is disclosed in U.S. Pat. No. 4,228,984. The system proposed therein incorporates a special type of closed, preloaded coil spring system along with a shock absorber which attenuates shocks and vibrations between the base and the seat assembly. The system also incorporates a lock-out device which renders the attenuating system inactive. However, the system disclosed therein incorporates numerous parts and requires a significant amount of space for installation.

As can be appreciated, as the number of functions incorporated into the seat suspension system increases, the amount of space available for other functions decreases. Thus, manufacturers are continually striving for a simplified type of suspension mechanism which can be incorporated into a limited and confined space.

SUMMARY OF THE INVENTION

According to the present invention, a horizontal attenuating system has been developed which includes a minimum number of parts that can be installed in a confined area on a seat support mechanism. The seat support suspension system is adapted to be interposed between a base and a seat frame that is movable in a fore and aft direction on the base, with the seat frame including transversely-spaced rails that receive anti-friction means carried by the base to accommodate the fore and aft movement. The suspension or attenuating system interposed between the base and the seat incorporates features that allow it to also be utilized for adjusting the fore and aft position of the seat frame on the base. More specifically, the seat frame has fore and aft spaced supports with a rod rotatably supported on the spaced supports and having an elongated enlarged intermediate portion or lug extending radially therefrom. First and second compressed coil springs are telescoped over the rod and interposed between the respective supports and the lug. A rack in the form of a plate is supported on the base and has an edge aligned with the rod. The plate has a plurality of axially-spaced notches defining the respective adjusted positions of the seat frame on the base. These adjusted positions are defined by having a portion of the lug received into the respective notches and adjustment can readily be made by rotating the rod to release the seat frame and then moving the frame to a new adjusted position.

The attenuating system also incorporates a shock absorber interposed between one of the supports and one end of the rod.

The system also incorporates a simplified lock-out means which cooperates with the lug and includes a second rod pivoted adjacent the first rod and having projections defining a space which is adapted to receive the lug to lock the seat frame on the seat base.

In the specific embodiment illustrated, the seat frame incorporates a pair of substantially C-shaped rails that have legs extending from opposite edges of a base with the legs being directed towards each other and the anti-friction means on the base are in the form of rollers received into these C-shaped channels and anti-friction members are positioned between the rollers and the base of the rails to prevent transverse movement of the seat frame on the base.

BRIEF DESCRIPTION OF SEVERAL VIEWS OF DRAWINGS

FIG. 1. is a side elevational view of a seat assembly having the present invention incorporated therein;

FIG. 2 is a plan view of the base and seat frame, as viewed along line 2—2 of FIG. 1;

FIG. 3 is an enlarged fragmentary view of a portion of the centering or attenuating device;

FIG. 4 is an enlarged fragmentary sectional view, as viewed along line 4—4 of FIG. 2;

FIG. 5 is an end view, as viewed along line 5—5 of FIG. 2; and,

FIG. 6 is a cross-sectional view, as viewed along line 6—6 of FIG. 3.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings discloses a seat assembly generally designated by reference numeral 10 having a seat cushion 12 supported on an upper seat frame 14 with a back rest 16 at the rear end of the seat cushion and arm rests 18 carried by the back rest.

The upper seat frame 14 is supported for vertical movement on a lower frame assembly 20 through a sissor-type linkage 22. A biasing system (not shown) is normally interposed between frames 14 and 20 to dampen vertical shock and vibration forces that are encountered during operation of the vehicle. One type of vertical suspension system that may be utilized is disclosed in pending application Ser. No. 261,271, filed May 6, 1981, incorporated herein by reference.

The lower frame assembly is the subject matter of the present invention and includes a lower base 30 that is normally fixed to the floor of a vehicle and an upper seat frame 32 which is movable in a fore and aft direction, generally designated by arrows 34. The seat frame 32 includes a pair of transversely-spaced rails 36 and 38 which are interconnected by cross-braces 40. Rails 36 and 38 extend generally parallel to each other and are substantially C-shaped in cross-section (FIG. 4) having upper and lower legs 42 extending from a base 44. The legs 42 of the respective rails extend towards each other to define inwardly-directed channels 46.

The base 30, which is generally rectangular in outline, has a pair of upstanding brackets 50 (FIG. 4) adjacent opposite edges with each bracket supporting a pair of rollers 52 which are rotatable about horizontal axes. Rollers 52 are received into channels 46 and are movable on the lower legs 42 of rails 36 and 38 and define anti-friction means for guiding seat frame 32 in the generally fore and aft direction. A plurality of thrust-washers 54 are interposed between the outer surface of each roller 52 and the outer surface of the base 44 of rails 36 and 38. These thrust-washers, which are preferably formed from a low-friction plastic material such as Delrin, prevent movement of the seat frame 32 transversely of the fore and aft direction of movement.

According to the present invention, a biasing and adjusting system 60 is interposed between seat frame 32 and base 30 which accommodates adjustment of the ride position of the seat frame 32 with respect to the base 30 and also absorbs shock and vibration forces in the fore and aft direction in any adjusted position. As illustrated in FIG. 2, the system 60 incorporates a rod 62 that is supported on a pair of support brackets 64 that depend from the lower surface of cross-braces 40. Rod 62 is limited to rotational movement on the support bracket 64 through washers 66 engaging surfaces of the bracket 64. A generally U-shaped lug 68 is supported on rod 62 at a point which is equally spaced from the support brackets 64 and extends radially to one side of the center of the rod, for a purpose that will be described later. A pair of compression coil springs 70 are respectively interposed between support brackets 64 and lug or intermediate portion 68. Thus, the coil springs 70 will absorb fore and aft shock loads and will return the seat frame 32 to a center position for any of the plurality of adjusted positions when external forces are removed. The shock attenuating system 60 also incorporates a shock absorber 72 which may be of any of several well-known commercial types. The shock absorber 72 has one end connected through a connection 74 to bracket 64 while the opposite end is connected to one end of rod 62 through a bracket 76.

The rod 62 also has a handle portion 78 at an opposite end which is exposed adjacent the forward edge of the lower frame assembly 20 (FIG. 1).

The rod 62 not only acts as a support for the coil spring 70, but also acts as an adjustment member for adjusting the fore and aft ride position for seat frame 32 on base 30. For this purpose, base 30 has a rack 80 consisting of a plate having one lateral edge 82 extending parallel to and laterally offset to one side of the center or axis of rod 62. The edge 82 of plate 80 has a plurality of recesses or notches 85 which are adapted to receive projections 84 (FIG. 6) on the lower edge of lug 68. Thus, to adjust the fore and aft ride position of seat frame 32 and also seat cushion 12, it is only necessary for the operator to grip handle 78 and pivot or rotate rod 62 in a counter-clockwise direction, as viewed in FIG. 6, to move the seat frame 32 and the seat supported thereon to any one of a plurality of positions between the phantom line positions of lug 68, shown in FIG. 2. Of course, in each of the adjusted positions or ride positions for the seat, the cushioning or attenuating means, including springs 70 and shock absorber 72, will operate in the same fashion and the vibration isolation characteristics of the system will be identical in all of the adjusted positions since the entire biasing mechanism moves with the upper seat frame 32.

According to a further aspect of the invention, a lock-out device is incorporated into the lower seat assembly 20 so that the seat frame 32 can be locked with respect to base 30, thereby rendering the vibration isolation system ineffective. Again, the lock-out system cooperates with the lug 68 and associated rod 62 to minimize the number of parts necessary for the overall system. As illustrated in FIGS. 2 and 3, the lockout system includes a second rod 90 that has a handle portion 91 adjacent handle 78 and extends parallel to the rod 62, being laterally offset to the same side as the radially-extending lug 68. Rod 90 is rotatably or pivotally supported on brackets 64 and has first and second projections 92 which are axially-spaced from each other and define a space 94. The projections 92 are welded to sleeves 96, which in turn are welded to rod 90, and the ends of sleeves 96 engage brackets 64 to prevent axial movement of rod 90. As shown in FIG. 3, the axial dimension of space 94 is equal to the axial dimension of lug 68 and, when in the position illustrated therein, locks the upper seat frame 32 to base 30 through plate 80. When it is desirable to have the attenuating system accommodate fore and aft cushioning of forces, the rod 90 is rotated counter-clockwise, as viewed in FIG. 6, to pivot projections 92 upwardly away from lug 68.

As can be appreciated from the above description, a very simple type of shock absorbing system has been devised which requires a minimum number of parts that can be installed in a very confined space. Of course, numerous modifications come to mind without departing from the spirit of the invention. For example, lug 68 could take other forms than the form or the U-shaped configuration illustrated in the drawings, such as a plate.

I claim:

1. A seat mount for a vehicle seat comprising a generally rectangular base having a plurality of rollers adjacent opposed edges, a seat frame having transversely-spaced parallel rails receiving said rollers, a pair of spaced support brackets on said seat frame with a first rod rotatably supported on said brackets and having a radially extending lug between said brackets, first and second coil springs telescoped on said first rod and respectively located between said brackets and said lug, a shock absorber extending parallel to said first rod with one end connected to one of said brackets and an opposite end connected to one end of said rod, said base having a plate having an edge extending parallel to said rod with spaced notches in said edge respectively adapted to receive at least a portion of said lug to define a plurality of different ride positions for said seat frame on said base, said coil springs acting to center said seat frame in each ride position and accommodate movement in opposite directions axially of said rod, and a lock-out member including a second rod extending parallel to said first rod and rotatably supported on said brackets, said second rod having projections defining a space for receiving said lug to lock said seat frame on said base.

2. A seat support mechanism comprising a base and seat frame movable in a fore and aft direction on said base, said frame including transversely spaced rails with said base having anti-friction means engaging said rails, said frame having fore and aft spaced supports, a first rod rotatably supported on said spaced supports and having an enlarged intermediate portion, first and second compressed coil springs telescoped over said rod and respectively located between respective supports and said intermediate portion, a rack on said base adjacent said rod and having spaced recesses defining a plurality of fore and aft positions on said seat frame on said base, said intermediate portion having means received into said recesses so that said rod can be rotated to release said frame from said base to accommodate adjustment of said frame on said base, and a second rod rotatable on said frame transversely spaced from said first rod and having a member adapted to engage said intermediate portion to lock said frame on said base.

3. A seat support mechanism comprising a base and seat frame movable in a fore and aft direction on said base, said frame including transversely-spaced rails with said base having anti-friction means engaging said rails, said frame having fore and aft spaced supports, a first rod rotatably supported on said spaced supports and having a lug extending radially of said rod, first and second compressed coil springs telescoped over said rod and respectively located between respective supports and said intermediate portion, a rack on said base adjacent said rod and having spaced recesses defining a plurality of fore and aft positions of said frame on said base, said lug having projections received into said recesses so that said rod can be rotated to release said frame from said base to accommodate adjustment of said frame on said base, and a second rod extending parallel to and transversely offset from said first rod, said second rod having spaced radially-extending projections defining a space for receiving said lug to fix said lug and frame to said base.

4. A seat support mechanism as defined in claim 2, further including a shock absorber extending parallel to said rod and having one end connected to said rod and an opposite end connected to said frame for dampening fore and aft movements of said frame on said base.

5. A seat support mechanism as defined in claim 2 in which said rails are substantially C-shaped in cross-section and have legs extending from bases towards each other and in which anti-friction means includes rollers rotatably supported on said base of said frame and engaging said legs for fore and aft movement and low-friction members between said rollers and said bases of said rails preventing transverse movement.

* * * * *